United States Patent
Sprague et al.

(10) Patent No.: US 10,288,797 B1
(45) Date of Patent: May 14, 2019

(54) STRUCTURAL ALIGNMENT FEATURES FOR LIGHT EMITTING DIODE ARRAYS

(71) Applicant: Amazon Technologies, Inc., Seattle, WA (US)

(72) Inventors: Robert Arthur Sprague, Saratoga, CA (US); Eric Gifford Marason, San Francisco, CA (US); Weihsin Hou, Fremont, CA (US); Juho Ilkka Jalava, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 193 days.

(21) Appl. No.: 15/384,001

(22) Filed: Dec. 19, 2016

Related U.S. Application Data

(60) Provisional application No. 62/411,802, filed on Oct. 24, 2016.

(51) Int. Cl.
*F21V 8/00* (2006.01)

(52) U.S. Cl.
CPC .......... *G02B 6/0068* (2013.01); *G02B 6/009* (2013.01); *G02B 6/0021* (2013.01); *G02B 6/0073* (2013.01); *G02B 6/0031* (2013.01); *G02B 6/0076* (2013.01)

(58) Field of Classification Search
CPC .... G02B 6/0068; G02B 6/009; G02B 6/0073; G02B 6/0021; G02B 6/0076; G02B 6/0031
See application file for complete search history.

(56) References Cited

U.S. PATENT DOCUMENTS

| | | | | |
|---|---|---|---|---|
| 2002/0140880 A1* | 10/2002 | Weindorf | ............. | G02B 6/0023 349/70 |
| 2009/0092366 A1* | 4/2009 | Iwasaki | ................ | G02B 6/0038 385/129 |
| 2009/0096956 A1* | 4/2009 | Uehara | ................ | G02B 6/0046 349/64 |
| 2009/0103009 A1* | 4/2009 | Ohmi | ..................... | G02B 6/002 349/65 |
| 2010/0302477 A1* | 12/2010 | Ohmi | ..................... | G02B 6/005 349/62 |
| 2013/0181896 A1* | 7/2013 | Gruhlke | .................. | G06F 3/017 345/156 |

* cited by examiner

*Primary Examiner* — Anh T Mai
*Assistant Examiner* — Glenn D Zimmerman
(74) *Attorney, Agent, or Firm* — Eversheds Sutherland (US) LLP

(57) ABSTRACT

Systems, methods, and computer-readable media are disclosed for structural alignment features for light emitting diode arrays. In one embodiment, a device may include a light guide with a first surface, a second surface opposite the first surface, and a third surface perpendicular to the first surface and the second surface. The device may include a light emitting diode array with a first set of light emitting diodes arranged in a first row and a second set of light emitting diodes arranged in a second row. The first set of light emitting diodes may be optically and physically coupled to the first surface, and the second set of light emitting diodes may be optically coupled to the second surface.

20 Claims, 16 Drawing Sheets

STRUCTURAL ALIGNMENT FEATURES FOR LIGHT EMITTING DIODE ARRAYS

CROSS-REFERENCE TO RELATED APPLICATIONS

This application claims the benefit of U.S. Provisional Application No. 62/411,802 filed Oct. 24, 2016, which is hereby incorporated by reference in its entirety.

BACKGROUND

A variety of electronic devices may use electronic displays to present content. Electronic displays may be, for example, backlit displays, or may otherwise use light emitting diodes (LEDs) to illuminate a display. Positioning and/or alignment of LEDs may affect a quality and/or functionality of displays that are illuminated by LEDs. In addition, certain LED arrays, such as LED arrays with multiple rows of LEDs may increase performance of displays, but may be difficult to incorporate into devices while maintaining a desired device thickness or profile. Further, incorrect alignment of LEDs may result in reduced device performance and decreased durability.

Figure 1:
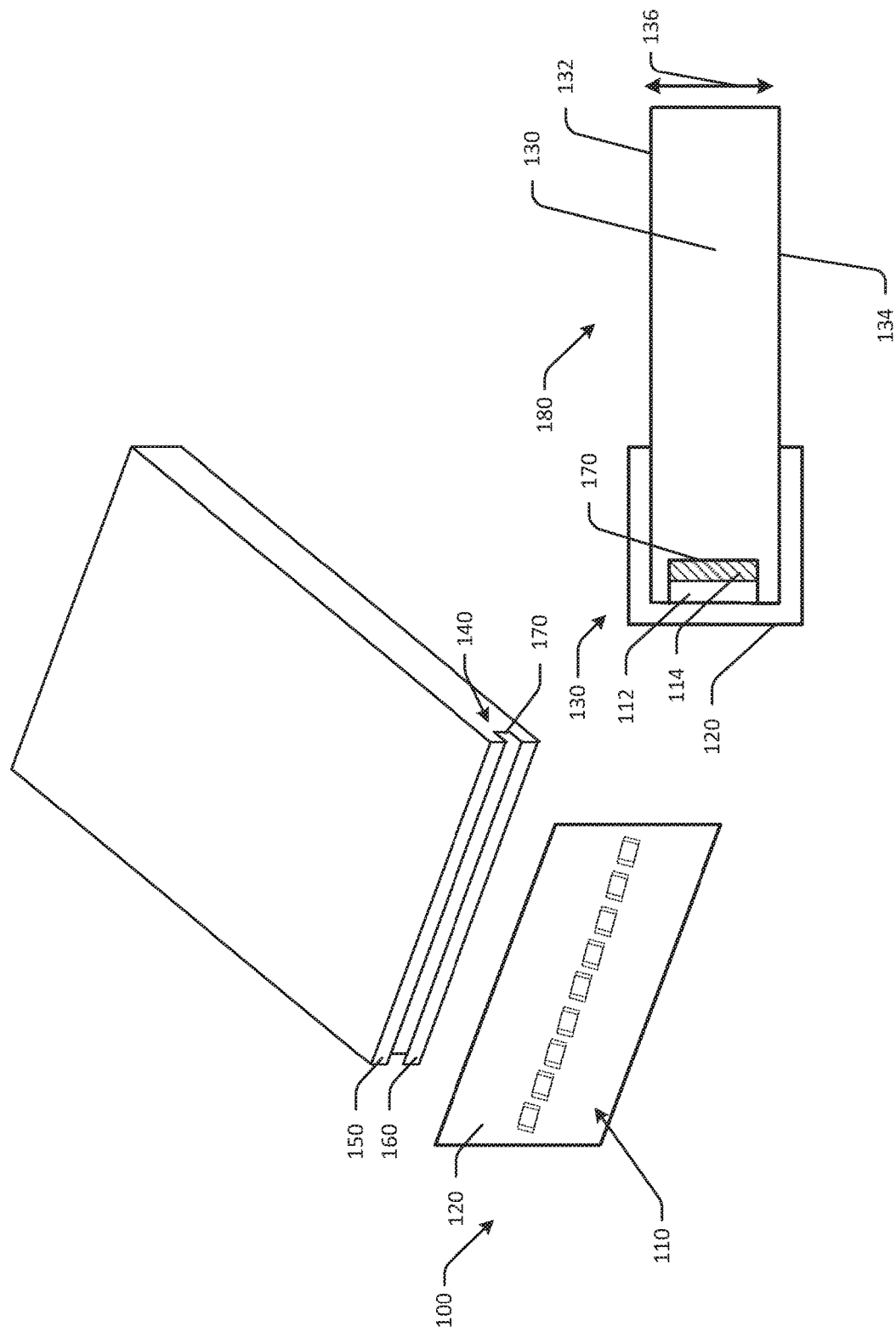
FIG. 1 is a schematic illustration of a light emitting diode (LED) array and a light guide in perspective and cross-sectional views in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

This disclosure relates to, among other things, systems, methods, computer-readable media, techniques, and methodologies for structural alignment and/or structural alignment features for light emitting diodes (LEDs) or LED arrays. In example embodiments of the disclosure, LED arrays may include one or more LEDs, such as inorganic LEDs (ILEDs), organic LEDs (OLEDs), micro-LEDs, and other LEDs. LED arrays may be optically coupled to one or more light guides so as to direct light from the LED arrays to the light guides. Due to thinness or thicknesses of light guides, which may be less than 100 microns in some instances, alignment between LEDs of LED arrays and light guides may be difficult. For example, an LED may have a height of 50 microns, while a light guide may have a thickness of 75 microns, and the LEDs may be aligned with an edge surface of the light guide for optimal light transmission. Accordingly, an alignment between LEDs and light guides may result in improved light transmission, display performance, and screen brightness, as well as other improvements.

Embodiments of the disclosure include alignment features, such as automatic alignment or self-alignment features, that may facilitate alignment between LEDs or LED arrays and one or more light guides. Certain embodiments include multiple LEDs that can be positioned not only at edge surfaces of light guides, but at one or more surfaces, such as top, bottom, and side surfaces, of light guides, which may increase an amount of light that can be directed to a light guide without increasing a thickness of the light guide. Terms such as "top" and "bottom" are used for description only and do not necessarily refer to absolute positions. In addition, directions at which light enters the light guide may be affected by placement of LEDs with respect to the light guide. For example, an LED on a top surface of a light guide may direct light downwards into the light guide, while an LED on a bottom surface of the light guide may direct light upwards into the light guide. Such embodiments may improve device or display brightness, contrast, performance, or other metrics impacted by light transmission or propagation through a light guide.

Certain embodiments may be used to illuminate displays and/or to electronically display content for any suitable electronic device, such as electronic reader devices, desktop computers, portable computers, smartphones, tablet computers, televisions, wearable devices, and so forth. Such devices may include displays that are used to present information or content to users. The displays may be emissive, reflective, or a combination thereof. An emissive display emits light to form an image. Emissive displays include, but are not limited to, backlit liquid crystal displays, organic light emitting diode displays, plasma displays, cathode ray tubes, light-emitting diodes, image projectors, and so forth. Reflective displays use incident light to form an image. Incident light may be provided, for example, by the sun, general illumination in a room or environment, a reading light, a front light, and so forth. Reflective displays include, but are not limited to, electrophoretic displays, interferometric displays, electrowetting, cholesteric displays, and so forth.

Certain embodiments of the disclosure include LED arrays with one or more color LEDs coupled to light guides or waveguides. The LED arrays may be positioned such that LEDs of the LED array illuminate, or at least partially illuminate, a waveguide and/or a light guide component of the display. The LED arrays may be aligned within specific tolerances so as to improve or otherwise maximize light transmission from the LED array to the waveguide.

In certain embodiments, the light guide or the waveguide may include one or more alignment features to align the LEDs to a certain portion of the waveguide, while in other embodiments, additional components may be included to align the LEDs to the waveguide.

Referring to FIG. 1, an LED array 100 and a light guide 130 are illustrated in perspective view in accordance with one or more embodiments of the disclosure. The LED array 100 may include one or more LEDs 110 mounted on a flexible substrate 120, such as a printed circuit board (e.g., a flexible printed circuit board, etc.) or another flexible substrate. The LEDs 110 may be any suitable LEDs, such as inorganic LEDs (ILEDs), organic LEDs (OLEDs), micro-LEDs, and other LEDs. Some or all of the LEDs 110 may be the same or different colors. For example, the LED array 100 may be a single color LED array (e.g., all LEDs are the same color), or the LED array 100 may be a multi-color LED array (e.g., a red, blue, green LED array, etc.).

The light guide 130 may include or be formed from one or more materials configured to direct light along a planar surface. The light guide 130 may therefore have a refractive index value that is determined based at least in part on the materials the light guide 130 is formed or made of In some implementations, the light guide 130 may be used to frontlight a reflective display by directing at least a portion of light from one or more illuminators onto a portion of the reflective display. The light guide 130 may be coupled to one or more components of a display stack with an adhesive or other material.

The LED array 100 may be positioned adjacent the light guide 130, such that light from the LEDs 110 is directed to the light guide 130. The LED array 100 and/or the LEDs 110 may be aligned to a certain portion of the light guide 130 within a certain tolerance, such as within about ten microns or less. This alignment in the thin direction, or the height, of the light guide 130 may be facilitated with certain embodiments.

To facilitate alignment of the LEDs 110 and/or the LED array 100 and the light guide 130, the light guide 130 may include an alignment feature 140. The alignment feature 140 may include a first member 150 extending from a body of the light guide 130 and a second member 160 extending from the body of the light guide 130. The first member 150 may be parallel to, or substantially parallel to, the second member 160. The first member 150 may be separated from the second member 160 by a distance that may be equal to, or greater than, a height of one or more of the LEDs 110. The first member 150 and the second member 160 may form a recessed area 170 that may receive one or more of the LEDs 110. For example, the first member 150 and the second member 160 may have lengths measured from the body of the light guide 130 that are equal to, or substantially equal to, a thickness of one or more of the LEDs 110, such that the LEDs 110 fit within the recessed area 170 that is formed by the first member 150 and the second member 160. The recessed area 170 may be formed as a groove in a side surface of the light guide 130, or may be formed by attaching the first member 150 and the second member 160 to the body of the light guide 130. In some embodiments, the recessed area 170 may be formed during a molding or forming process, or could be machined or die cast.

By creating the recessed area 170 using the first member 150 and the second member 160, the LEDs 110 of the LED array 100 may be automatically aligned with the edge surface of the light guide 130. As a result, light transmission may be improved or optimized from the LEDs 110 to the light guide 130.

The light guide 130 may include a top surface 132 and a bottom surface 134. The bottom surface 134 may be parallel to the top surface 132. The light guide 130 may have a thickness 136. The light guide 130 may be formed from, or at least partially formed from, a material having a first refractive index value.

As illustrated in cross-sectional view 180, the LED array 100 may be optically coupled to the light guide 130. Specifically, a first LED 112 of the LED array 100 may be positioned within the recessed area 170 and optically coupled to a side surface of the light guide 130. A layer 114 of an optically clear adhesive, or another optically clear medium, may be positioned between the first LED 112 and the light guide 130. The substrate 120 may include one or more folds (e.g., molded with folds) or fold lines that match the thickness 136 of the light guide 130, so as to facilitate coupling of the LED array 100 to the top surface 132 and bottom surface 134 of the light guide 130.

In some embodiments, a display assembly may include an LED illuminator assembly with one or more LEDs positioned on a substrate, and a light guide. The light guide may include an alignment feature positioned at an end of the light guide. The alignment feature may include a first portion extending from a top of the light guide, and a second portion extending from a bottom of the light guide, where the first portion is parallel to the second portion. The first portion may be separated from the second portion, and an LED edge surface may be defined between the first portion and the second portion. The LED edge surface may be substantially perpendicular to the first portion and the second portion. The LEDs may be at least partially positioned between the first portion and the second portion, and the LEDs may be aligned with the LED edge surface, such that light emitted from the LEDs is at least partially directed to the light guide.

With the configuration illustrated in FIG. 1, the alignment feature 140 of the light guide 130 facilitates alignment of the LEDs 110 within a strict tolerance, and may optimize performance of the display that includes the light guide 130.

Accordingly, the systems, methods, computer-readable media, techniques, and methodologies described herein may improve light transmission by facilitating alignment of LEDs and light guides, and may improve display functionality or performance by increasing directions of light entry into a light guide. Although discussed herein in the context of e-readers, the systems, methods, and apparatuses of the disclosure may be applicable to other electronic devices.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure. The above-described embodiments and additional and/or alternative embodiments of the disclosure will be described in detail hereinafter through reference to the accompanying drawings. The techniques are described below with reference to the following devices and processes. However, a number of other devices may also employ these techniques. While FIG. 1 illustrates one example display stack, multiple other forms of display stacks, devices, and architectures may be included in other embodiments.

Illustrative Embodiments and Use Cases

Figure 2:
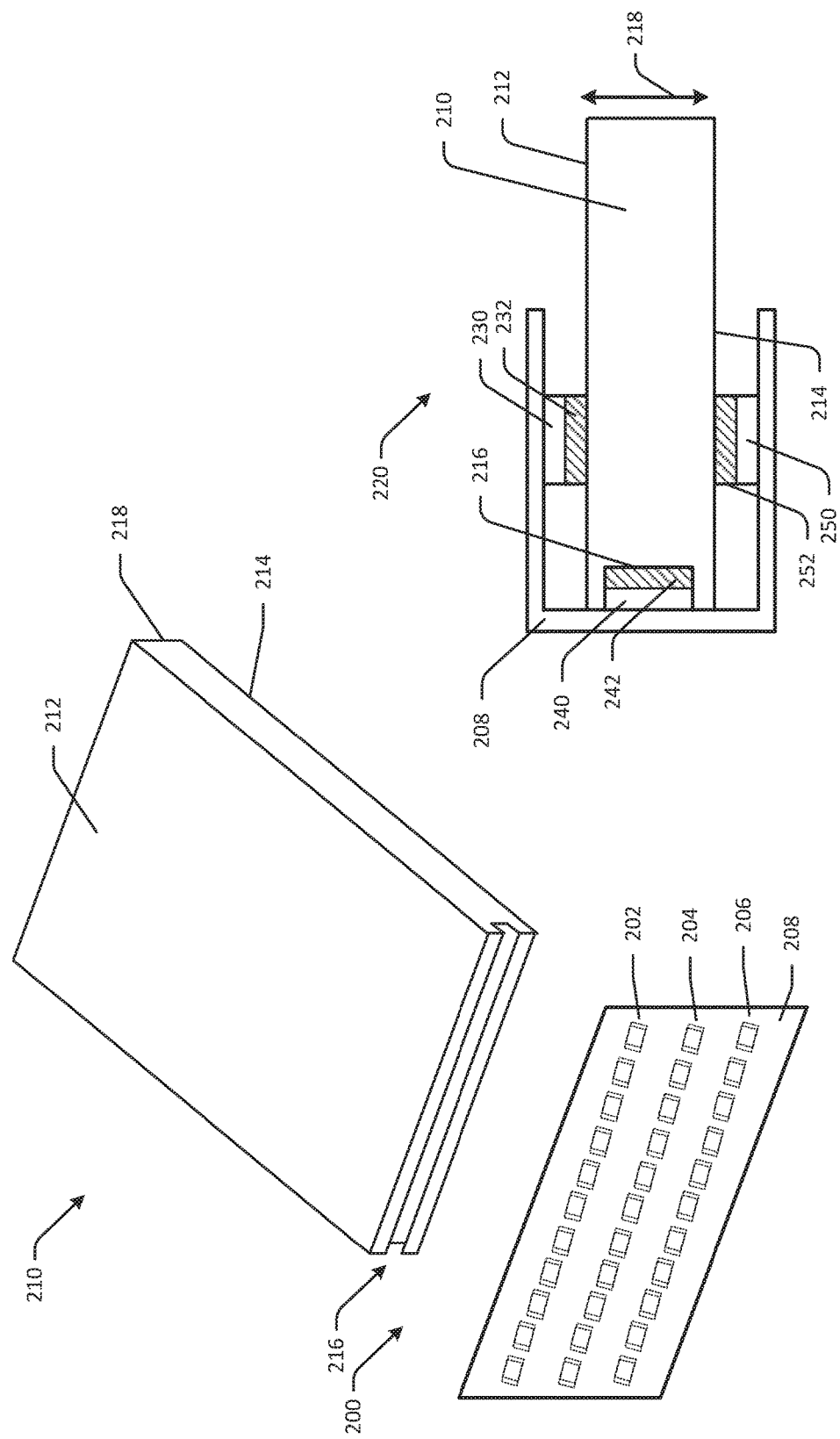
FIG. 2 is a schematic illustration of a multi-row LED array and a light guide in perspective and cross-sectional views in accordance with one or more embodiments of the disclosure.

Referring to FIG. 2, FIG. 2 illustrates a multi-color LED array 200 and a light guide 210 in perspective view in accordance with one or more embodiments of the disclosure. The LED array 200 in FIG. 2 may include one or more LEDs that may be one or more of multiple LED colors, such as yellow and blue, or red, blue, and green, or yellow and white, or other colors and combinations, so as to achieve color changing functionality. In FIG. 2, colored LEDs may be are alternated to facilitate shifting color depending on the relative intensity of each set of one or more LEDs. The example of FIG. 2 may include blue and yellow LEDs, yellow and white LEDs (for achieving white shift), red-blue-green LEDs (for full color), or many other combinations. The LED array 200 and the light guide 210 may be part of a display stack in an electronic device and may include a display panel. The light guide 210 may be optically coupled to the display panel.

The LED array 200 may include a flexible printed circuit board 208, or another flexible substrate. The LED array 200 may include one or more rows of LEDs. For example, the LED array 200 may include a first set of LEDs arranged in a first row 202 mounted on the flexible printed circuit board 208, a second set of LEDs arranged in a second row 204 mounted on the flexible printed circuit board 208, and a third set of LEDs arranged in a third row 206 mounted on the flexible printed circuit board 208. Some or all of the LEDs may be the same or different colors. Some or all of the LEDs may have the same or different dimensions. The LEDs may be adhered or otherwise attached to the flexible printed circuit board 208.

The light guide 210 may include a top surface 212 and a bottom surface 214. The bottom surface 214 may be parallel to the top surface 212. The light guide 210 may include a side surface 216 that is perpendicular to the top surface 212 and the bottom surface 214. The side surface 216 may be a flat side surface or may include an alignment feature, as illustrated in FIG. 2. The light guide 210 may have a thickness 218. The light guide 210 may be formed from, or at least partially formed from, a material having a first refractive index value.

As illustrated in cross-sectional view 220, the LED array 200 may be optically coupled to the light guide 210. Specifically, the first set of LEDs in the first row 202 of the LED array 200 may be optically coupled to the top surface 212, the second set of LEDs in the second row 204 of the LED array 200 may be optically coupled to the side surface 216, and the third set of LEDs in the third row 206 of the LED array 200 may be optically coupled to the bottom surface 214. In some embodiments, the second row 204 may not be included.

In some embodiments, one or more of the LEDs of the LED array 200 may be optically coupled to the light guide 210 with an optically clear adhesive. For example, the first set of LEDs in the first row 202 may include a first LED 230. The first LED 230 may be optically coupled to the top surface 212 of the light guide 210 with a first layer 232 of an optically clear adhesive. The first layer 232 may be positioned at least partially between the first row 202, or the first LED 230, and the top surface 212. The second set of LEDs in the second row 204 may include a second LED 240. The second LED 240 may be optically coupled to the side surface 216 of the light guide 210 with a second layer 242 of the optically clear adhesive. The optically clear adhesive forming the second layer 242 may be the same or different than the optically clear adhesive forming the first layer 232. The second layer 242 may be positioned at least partially between the second row 204, or the second LED 240, and the side surface 216. As illustrated in FIG. 2, the second LED 240 may be positioned within the alignment feature at the side surface 216 of the light guide 210. The alignment feature may be dimensioned so as to accommodate or receive the second LED 240 and the second layer 242. The third set of LEDs in the third row 206 may include a third LED 250. The third LED 250 may be optically coupled to the bottom surface 214 of the light guide 210 with a third layer 252 of the optically clear adhesive. The optically clear adhesive forming the third layer 252 may be the same or different than the optically clear adhesive forming the first layer 232 and/or the second layer 242. The third layer 252 may be positioned at least partially between the third row 206, or the third LED 250, and the bottom surface 214. Other embodiments may not include optically clear adhesive layers, or may include additional or fewer optically clear adhesive layers.

A refractive index value of an optical medium is a dimensionless number that indicates how light, or any other radiation, propagates through that specific medium. A refractive index value of a specific medium is defined as $n=c/v$ where c is the speed of light in vacuum and v is the speed of light in the substance. For example, the refractive index value of water is 1.33, meaning that light travels 1.33 times faster in a vacuum than it does in water. Other methods of calculating or measuring refractive index values may be used herein.

The optically clear adhesive forming one or more of the first layer 232, the second layer 242, and/or the third layer 252 may have a second refractive index value that is equal to, substantially equal to, or greater than, the first refractive index value of the material forming the light guide 210. In some instances, the second refractive index value of the optically clear adhesive may be less than the first refractive index value of the material forming the light guide 210.

The optically clear adhesive that couples the LEDs to the light guide 210 may be in liquid or non-liquid form. Liquid optically clear adhesive may be liquid-based and may bind the light guide 210 to the LEDs. The optically clear adhesive may improve optical characteristics of the device, as well as durability. Liquid optically clear adhesives may be malleable and/or less firm than other adhesives, and may therefore bind to non-even surfaces. Non-liquid optically clear adhesives, such as optically clear adhesive tape, may be used to bind one or more layers of a display stack together. Optically clear adhesive may be cured via ultraviolet light, heat, moisture, or a combination thereof. Optically clear adhesive may also reduce or eliminate an air gap between components or layers of a display stack.

In other embodiments, the optical coupling between the LED array 200 and the light guide 210 may include one or more of physical proximity, an air gap, an adhesive, a mechanical interface, and so forth. In some implementations, one or more surface features may be provided on the light guide 210. These surface features, such as diffusers, grooves, grating, dimples, lenses, planar surfaces, concave surfaces, convex surfaces, and so forth, may be used to enhance or attenuate the transmission of light between the LEDs and the light guide 210. In some implementations, these surface features may be separate or discrete elements which have been coupled to the light guide 210. For example, a microlens array may be adhered to the light guide 210 to aid the optical coupling with an LED.

By coupling the LEDs to the light guide 210 with an optically clear adhesive having a specific refractive index value between that of the LEDs and the light guide 210, light may be prevented from escaping the light guide 210.

Figure 3:
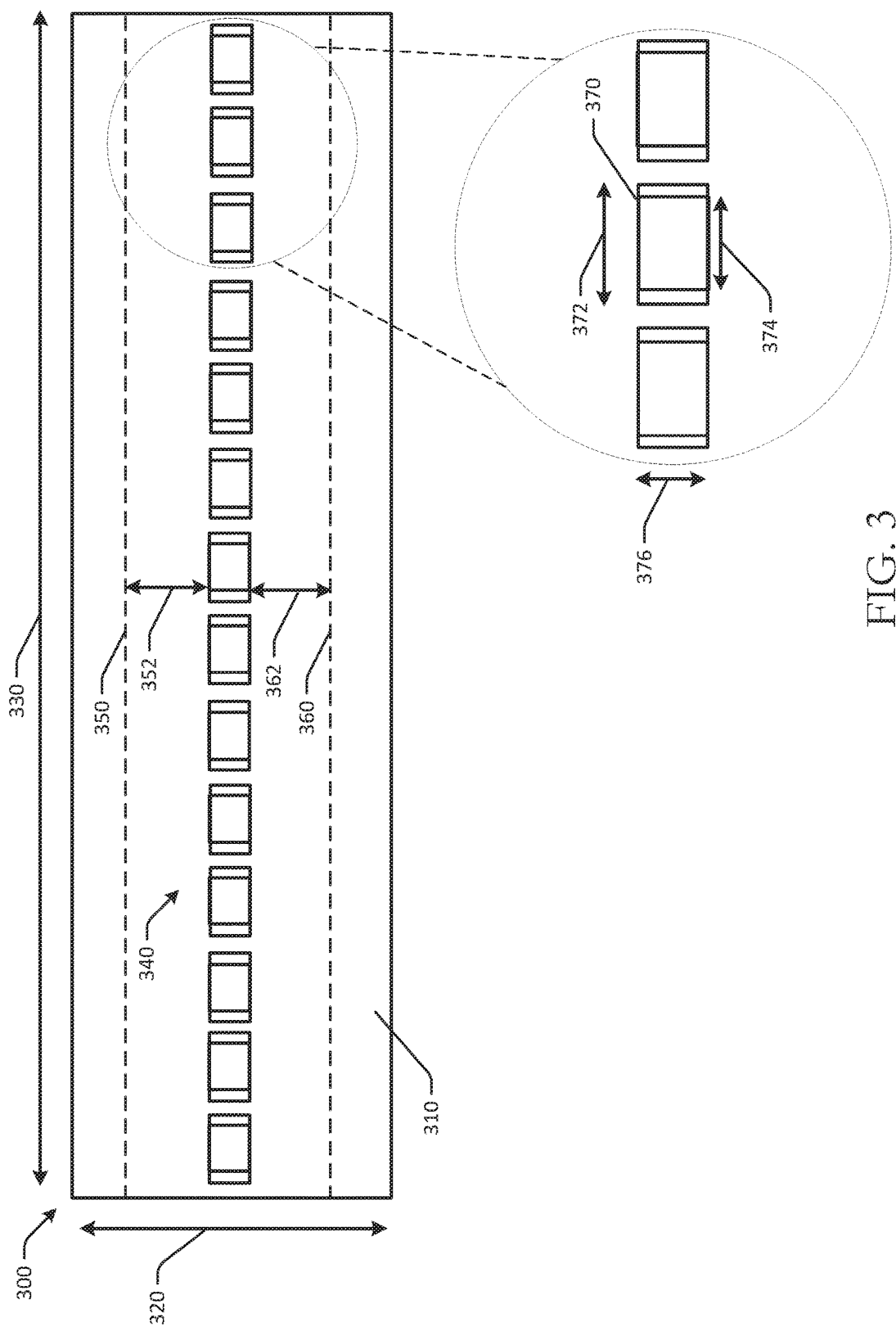
FIG. 3 is a schematic illustration of an LED array in accordance with one or more embodiments of the disclosure.

FIG. 3 illustrates an LED array 300 in accordance with one or more embodiments of the disclosure. The LED array 300 may be a red-blue-green ILED array for waveguide or light guide illumination. The LED array 300 may include a flexible substrate 310 with a height 320 of about 5 centimeters, and a width 330 of about 14 centimeters, or other dimensions, in one example. The LED array 300 may include one or more LEDs 340 mounted on the flexible substrate 310. While one row of LEDs 340 is illustrated in FIG. 3, any number of rows may be included.

The LED array 300 may include one or more fold lines on the flexible substrate 310. The one or more fold lines may be used to align the LEDs 340 with a light guide, for example. The fold lines may be creases, score lines, perforations, dents, grooves, or other features that facilitate folding of the flexible substrate 310 at a predetermined location. In FIG. 3, the LED array 300 may include a first score line 350 on the flexible substrate 310. The first score line 350 may be positioned a first distance 352 from a top of the row of LEDs 340. In some embodiments, the score line or fold line may be positioned based on distance from another portion of one or more LEDs or portion of the flexible substrate. The LED array 300 may include a second score line 360 on the flexible substrate 310. The second score line 360 may be positioned a second distance 362 from a bottom of the row of LEDs 340. The first distance 352 may be equal to the second distance 362, so as to position the LEDs 340 at the center between the first score line 350 and the second score line 360. The total distance between the first score line 350 and the second score line 360 (e.g., first distance+second distance+height of LED, etc.) may be equal to or substantially equal to, or slightly greater than, a thickness of a light guide to which the LED array 300 is being mounted. Accordingly, the LEDs 340 may be automatically aligned when the flexible substrate 310 is folded or creased at the score lines.

The LED array 300 may include a first LED 370 with an illuminating region height 376 of about 50 microns, an illuminating region width 374 of about 75 microns, and a chip center-to-center spacing 372 of about 100 microns. The diode position accuracy may be within (e.g., +/−) about 10 microns. Diode output, in one embodiment, may include a red diode, a blue diode, and a green diode of which one or more, or each, diode may be configured to output a maximum of 40 lumen per watt. Output ratios for respective colors may be separately adjustable. Power uniformity for each color may be within (e.g., +/−) about 10%.

Figure 4:
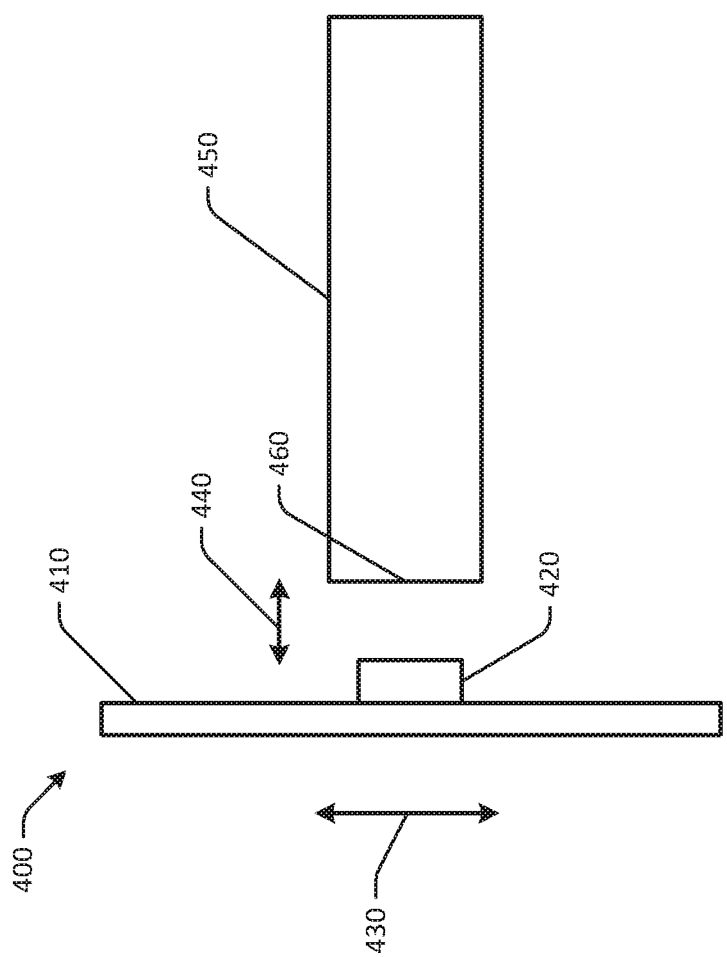
FIG. 4 is a schematic illustration of an LED array and a light guide in vertical cross section view in accordance with one or more embodiments of the disclosure.

FIG. 4 illustrates an LED array 400 and a light guide 450 in vertical cross section view in accordance with one or more embodiments of the disclosure. The LED array 400 may include one or more LEDs 420 mounted to a flexible substrate 410. The alignment of the LED array 400 in the "Y" direction 430 with respect to the light guide 450 may be a critical alignment and may be subject to a tolerance of 10 microns for optimal performance. Specifically, the LEDs 420 may have a tolerance of about 10 microns or less when positioned against a surface 460 of the light guide 450. Further, a distance 440 between the LED array 400 and the light guide 450 may be equal to or close to zero, such that the LEDs 420 are in contact with the light guide 450. The LED array 400 may be positioned within a certain portion, such as the side surface 460, of the light guide 450, for optimal performance.

Figure 5:
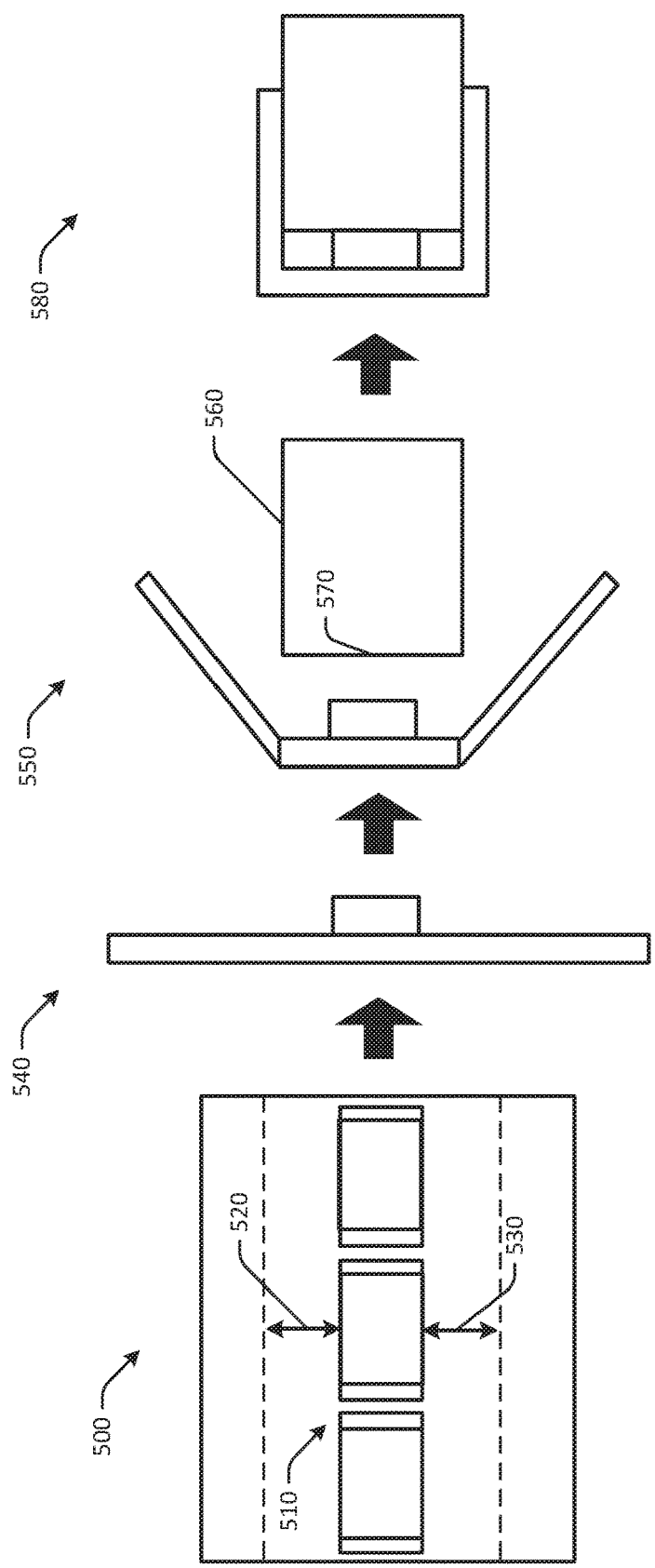
FIG. 5 is a schematic illustration of an LED array coupled to a light guide in accordance with one or more embodiments of the disclosure.

FIG. 5 is a schematic illustration of an LED array 500 coupled to a light guide 560 in accordance with one or more embodiments of the disclosure. The LED array 500 may include one or more micro-LEDs 510. The one or more micro-LEDs 510 may be the same or different colors. In one embodiment, the micro-LEDs 510 may be flip-chip bonded directly to a metal trace or another substrate with a conductive glue or anisotropic conductive film (ACF). The micro-LEDs 510 can be red, green, blue, or another monochrome color LED to provide color tunable linear light. In one embodiment, the red, green, and/or blue LED chip can be in a different arrangement to create different color mixing and/or color tuning effects. The micro-LEDs 510 can be ultraviolet LEDs with phosphor coating on a top surface.

The micro-LEDs 510 may be mounted or coupled to a substrate, as shown in side view 540. The substrate can be a flexible PCB with white color overlay, in one example. In another example, the substrate can be a white tape with an LED flexible printed circuit (FPC) laminated on the white tape. In another example, the substrate can be a white tape with metal traces printed on the white tape to drive one or more LEDs 510. The substrate may be a reflective material. In some embodiments, an adhesive layer may be positioned on a surface of the substrate to adjust the refractive index between the white tape and light guide. The substrate may be flexible and may be folded and/or directly laminated on the light guide. For example, as shown in cross-sectional view 580, the substrate may be laminated onto the light guide with the LEDs 510 aligned in a proper position. The LED array 500 may include a first fold line and a second fold line at the substrate. The LEDs 510 may be positioned a first distance 520 from the first fold line and a second distance 530 from the second fold line. The first distance 520 may be the same or different than the second distance 530. As shown in first position 550 and second position 580, the LED array 500 may be bent at the fold lines to automatically align the LEDs 510 to the LED edge surface 570. In some embodiments, the flexible substrate may be bent 90 degrees, while in other embodiments, the flexible substrate may be bent at different angles.

The LEDs 510 may directly contact an LED edge surface 570 of the light guide 560. In some embodiments, the LEDs 510 may automatically align on the LED edge surface 570. For example, one or more alignment features may be included to align the LEDs 510 on the LED edge surface 570.

As shown in FIG. 5, the LEDs 510, the substrate, and/or another portion of the LED array 500 can be displaced on one or more sides of the light guide. In the illustrated embodiment, the substrate may be disposed about at least three sides or three surfaces of the light guide. In other embodiments, one or more portions of the LED array can be displaced on two sides or four sides, or more, of the light guide 560.

In one embodiment, the light guide 560 may have a thickness of equal to or less than about 250 um. In such instances, a distance between the fold lines may be equal to or greater than 250 um. In another embodiment, the light guide 560 may have a thickness of equal to or less than about 100 um. In such instances, a distance between the fold lines may be equal to or greater than 100 um. The light guide 560 may be flexible. The LED edge surface 570 may be rough or smooth, and may include surface patterns. The light guide 560 may include more than one LED edge surface 570.

Figure 6:
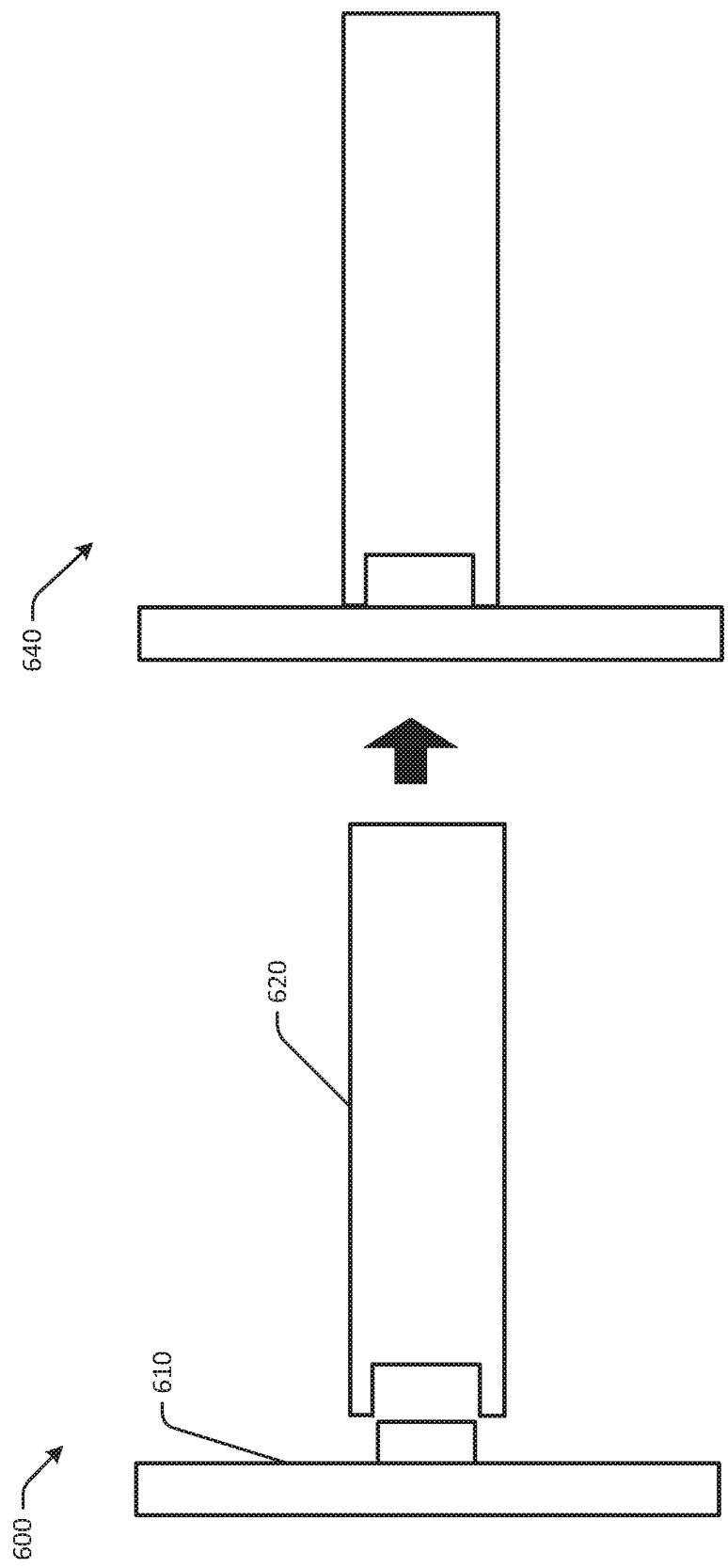
FIG. 6 is a schematic illustration of an LED array and a light guide with an alignment feature in vertical cross section view in accordance with one or more embodiments of the disclosure.

FIG. 6 illustrates an LED array 610 and a light guide 620 with an alignment feature 630 in vertical cross section view in a separated position 600 and in an aligned position 640 in accordance with one or more embodiments of the disclosure. In FIG. 6, the LED array 610 may include one or more LEDs mounted to an LED flexible substrate, such as a printed circuit board. The LEDs may be positioned about a particular portion of the light guide for optimal performance. The substrate can be a flexible PCB with white color overlay, in one example. In another example, the substrate can be a white tape with an LED flexible printed circuit (FPC) laminated on the white tape. In another example, the substrate can be a white tape with metal traces printed on the white tape to drive one or more LEDs.

The light guide 620 may include one or more alignment features. For example, the light guide may include a structure 630 formed at a front end or another portion of the light guide 620 that may facilitate alignment (or automatic alignment) of the LEDs to the LED edge surface of the light guide 620. The alignment feature 630 may be a structure formed on an end of the light guide 620 with two or more raised ridges on the end of the light guide 620. The two or more raised ridges may be separated or spaced apart slightly more than a width of the LEDs. When assembled, the structure may be in contact with the LEDs or may force or guide the LEDs to the proper alignment or position. The structure 630 may be used to achieve alignment within a tolerance of less than about 10 microns. Other embodiments may include one or more three dimensional structures on the end of the light guide. The structure or alignment feature may be part of the light guide 620, or may be separately attached. For example, the alignment feature may be molded, formed, separately formed and coupled to the light guide (which could align to both the light guide and the LEDs), etc. The alignment feature 630 may be machined at the end of the light guide, or could be die cast in some instances.

Figure 7:
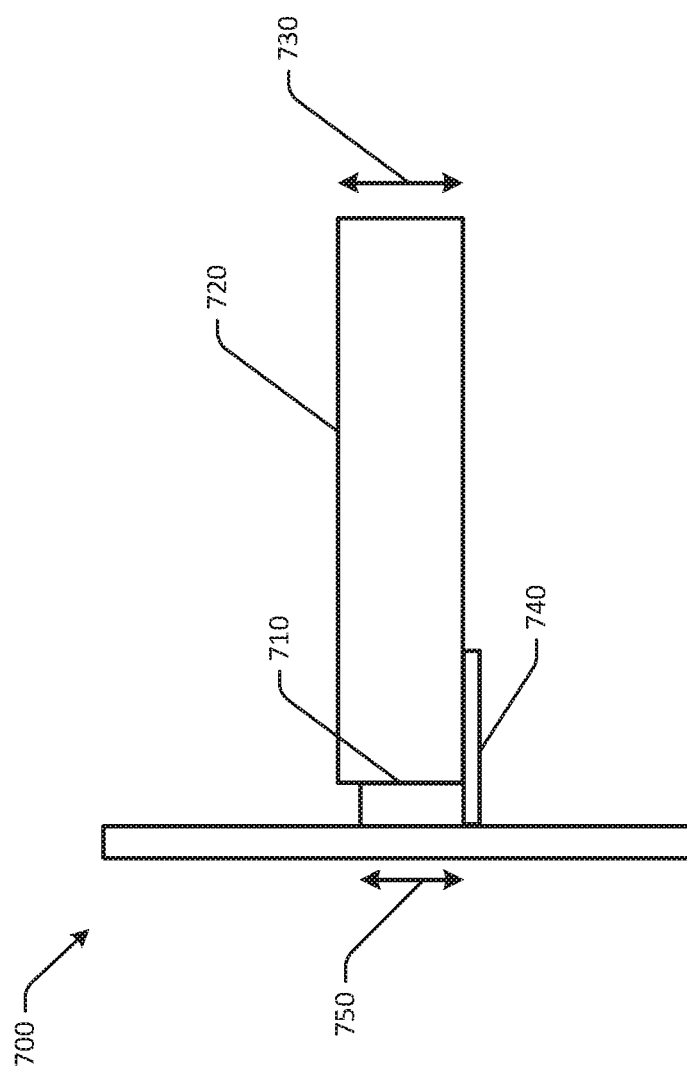
FIG. 7 is a schematic illustration of an LED array and a light guide with a laminated alignment piece in vertical cross section view in accordance with one or more embodiments of the disclosure.

FIG. 7 is a schematic illustration of an LED array 700 and a light guide 720 with a laminated alignment piece 740 in vertical cross section view in accordance with one or more embodiments of the disclosure. In FIG. 7, a separate alignment feature may be used to align LEDs 710 of the LED array 700 to an LED edge surface of the light guide 720. The separate alignment feature may be a laminated material segment 740. The laminated material segment 740 may be a flat piece of material that is laminated to at least one side of the light guide 720. The laminated material segment 740 may be pressed laterally against, or otherwise in contact with, the LEDs 710 to align the LEDs 710 with the light guide 720. In the illustrated embodiment, the LED array 700 may be cut to a suitable width, such that a center of the illuminating region is aligned with a center of the light guide 720. The laminated material segment 740 may control alignment of the LEDs 710 in the vertical direction. In some embodiments, the laminated material segment 740 may be laminated or coupled to the LEDs 710 or the LED array 700. A height 750 of the LEDs 710 may be less than a thickness 730 of the light guide 720. The LEDs 710 may rest on the laminated material segment 740. For example, a bottom of the LEDs 710 may be supported by the laminated material segment 740. The laminated material segment 740 may be formed of plastic, such as a rigid plastic. Other shapes and sizes of separate alignment devices or features can be used.

Figure 8:
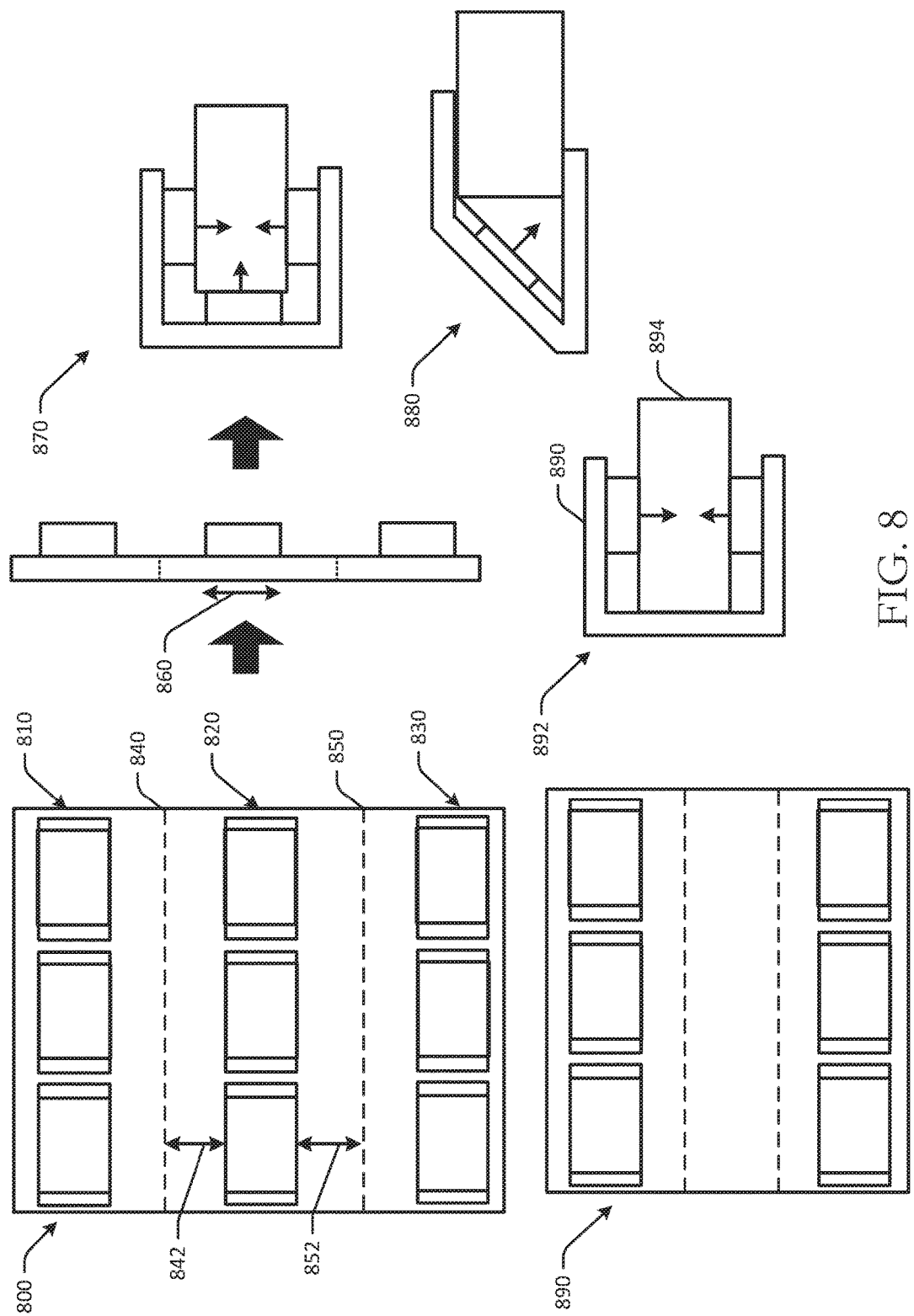
FIG. 8 is a schematic illustration of additional embodiments of LED arrays coupled to light guides in accordance with one or more embodiments of the disclosure.

FIG. 8 is a schematic illustration of additional embodiments of LED arrays coupled to light guides in accordance with one or more embodiments of the disclosure. In FIG. 8, another embodiment of an LED array 800 is illustrated. The LED array 800 may include a flexible substrate with at least three sets of LEDs arranged in rows and mounted on a surface of the flexible substrate. One or more, or each, of the at least three sets of LEDs may include a plurality of LEDs. For example, in FIG. 8, the LED array 800 includes a first set of LEDs arranged in a first row 810, a second set of LEDs arranged in a second row 820, and a third set of LEDs arranged in a third row 830 of LEDs. The first set of LEDs in the first row 810 may be spaced apart from the second set of LEDs in the second row 820 by a first distance 842, and the second set of LEDs in the second row 820 may be spaced apart from the third set of LEDs in the third row 830 by a second distance 852. The first distance 842 may be the same or different than the second distance 852, and may be dependent upon a configuration of a corresponding light guide. The LED array 800 may include a first fold line 840 positioned between the first set of LEDs in the first row 810 and the second set of LEDs in the second row 820, and a second fold line 850 positioned between the second set of LEDs in the second row 820 and the third set of LEDs in the third row 830. A third distance 860 between the first fold line 840 and the second fold line 850 may be equal to or greater than a thickness of a corresponding light guide. In some embodiments, a distance between a first central axis of the first set of LEDs in the first row 810 and the first score line or first fold line 840 may be equal to a distance between a second central axis of the second set of LEDs in the second row 820 and the second score line or second fold line 850.

The LED array 800 may be coupled to a light guide, as shown in a first embodiment 870. The light guide may include a first surface, a second surface that traverses the first surface, and a third surface that is substantially parallel to the first surface. The first set of LEDs in the first row 810 of the LED array 800 may be optically coupled to the first surface of the light guide, the second set of LEDs in the second row 820 of the LED array 800 may be optically coupled to the second surface of the light guide, and the third set of LEDs in the third row 830 of the LED array 800 may be optically coupled to the third surface of the light guide. In the first embodiment, the LED array 800 may direct light to the light guide from three different surfaces, which may result in improved display performance. In some embodiments, the first set of LEDs in the first row 810 and the third set of LEDs in the third row 830 of LEDs may directly oppose each other, while in other embodiments, the first set of LEDs in the first row 810 may be offset from the third set of LEDs in the third row 830, or the third set of LEDs in the third row 830 may be offset from the first set of LEDs in the first row 810.

In a second embodiment 880, the LED array 800 may include one row of LEDs and the light guide may have a titled or angled end face. The light guide may be narrow, resulting in, or as a result of, the angled end face. The LED array 800 may be coupled to the light guide with the angled end face, such that the LEDs are aligned with the LED edge surface of the light guide, which may correspond to the angled end face. In the light guide of the second embodiment 880, the second surface of the light guide may be positioned at an obtuse angle with respect to the first surface, or the top surface of the light guide, and an acute angle with respect to the third surface, or the bottom surface of the light guide. One or more of the edge surfaces of the light guide, such as the angled edge surface, the top surface, or the bottom surface, may be polished, machined, or coated with a reflective material to create a mirror surface or a mirror-like surface, thereby increasing light propagation through the light guide. Some embodiments may include a separate mirror element coupled to the light guide or the LED array 800. In some embodiments, another row of LEDs may be positioned along a bottom surface of the angled portion of the light guide. The angled portion may be a separate portion coupled to the light guide, or may be formed in the light guide.

In a third embodiment illustrated in FIG. 8, an LED array 890 may include two rows of LEDs. In cross-sectional view 892, the LED array 890 is be coupled to a light guide 894 in a wrapped configuration, such that the LED array 890 is in contact with two or more surfaces of the light guide 894. In some embodiments, LEDs may be in contact with two or more surfaces of the light guide 894 in such configurations. Specifically, in the third embodiment, the light guide 894 may include a first surface, a second surface opposite the first surface, and a third surface perpendicular to the first surface and the second surface. The LED array 890 may include a first row of LEDs and a second row of LEDs mounted on a flexible printed circuit board. The first row of LEDs may optically coupled to the first surface, or the top surface of the light guide 894, and the second row of LEDs may be optically coupled to the second surface, or the bottom of the light guide 894. The flexible substrate may be in contact with the side surface of the light guide 894, as illustrated. The first row and the second row of LEDs may be aligned. For example, a first central axis of the LED array 890 may be aligned with a second central axis of the side surface of the light guide 894. The first row of LEDs may have a first height and the second row may have a second height that is equal to the first height.

In the third embodiment, the LED array 890 may be positioned such that a first LED is in contact with a first surface of the light guide 894, while a second LED is in contact with a second surface of the light guide 894 that opposes the first surface. For example, the light guide 894 may be a narrow light guide, and the LEDs may be aligned with top and/or bottom surfaces of the light guide 894. In another embodiment, two separate flexible substrates can be used and applied to the top and bottom surfaces of the light guide 894, so as to avoid the substrate in contact with the side surface of the light guide 894.

Some embodiments may include an optional mirrored surface that may be coupled to the light guide or the LED array and positioned about an edge surface of the light guide to enhance an intensity of light emitted by the LEDs. For example, at the side surface in the third embodiment 890, a separate mirror component may be positioned between the flexible substrate and the light guide, or the side surface of the light guide may be machined or polished, or at least partially covered with a reflective coating, such as an evaporated aluminum coating, a white layer, a silver layer, an aluminum layer, or another reflective layer.

Figure 9:
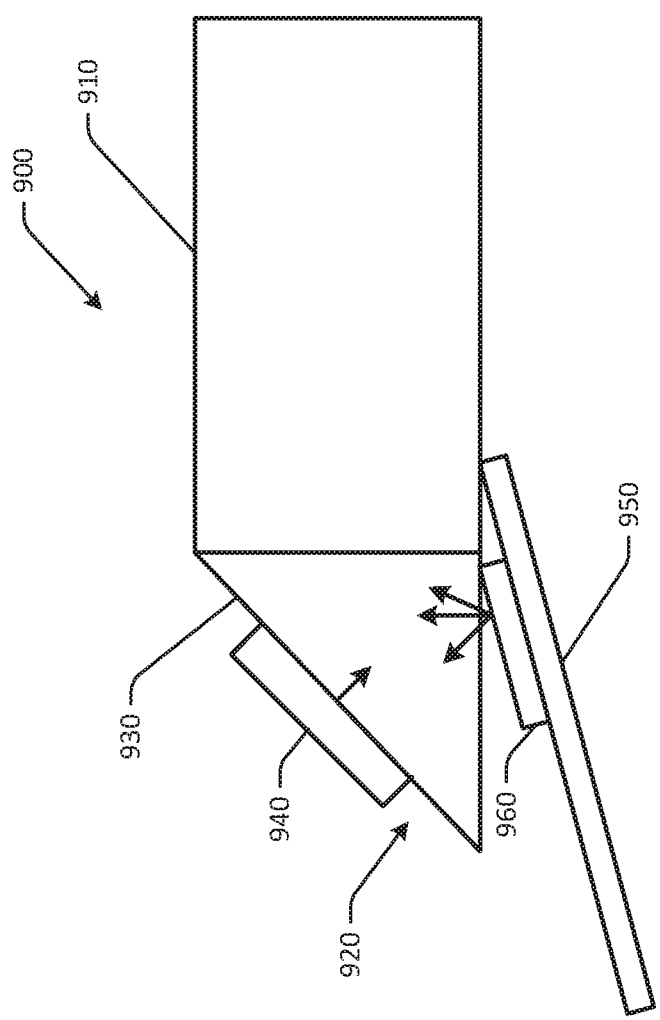
FIG. 9 is a schematic illustration of another embodiment of an LED array coupled to a light guide and a mirror surface in accordance with one or more embodiments of the disclosure.

FIG. 9 is a schematic illustration of another embodiment of an LED array 900 coupled to a light guide 910 and a tilted mirror surface 940 in accordance with one or more embodiments of the disclosure. In FIG. 9, an angled or tilted mirror surface 940 may be mounted to a portion of an angled light guide surface 920 to reflect light. The mirror surface 940 may be a separate component and may be coupled to one or more surfaces of the light guide, or may be a coating or a polished surface. In some embodiments, the mirror surface 940 may be a part of, for example, the LED array and/or the light guide. Light output from one or more LEDs 960 may pass through a surface of the light guide 910, such as a bottom surface, and may be reflected by the mirror surface 940 and into the light guide 910. The LEDs 960 may be mounted on a substrate 950. Other embodiments may include a reflective coating, a machined or polished surface, or another reflection mechanism.

Figure 10:
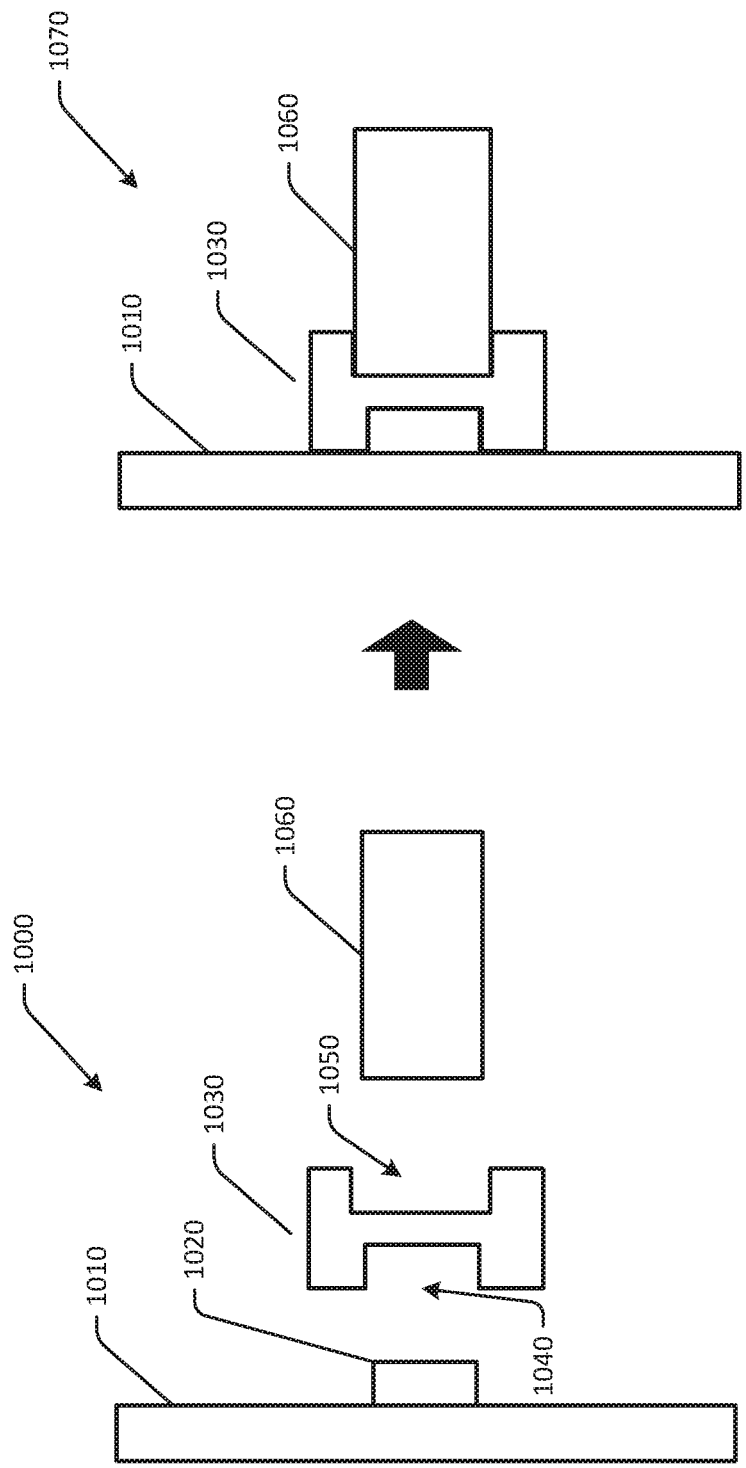
FIG. 10 is a schematic illustration of another embodiment of an LED array coupled to a light guide with a coupling device in accordance with one or more embodiments of the disclosure.

FIG. 10 is a schematic illustration of another embodiment of an LED array 1010 coupled to a light guide 1060 with a coupling device 1030 in accordance with one or more embodiments of the disclosure. In a first position 1000, the LED array 1010 may include one or more LEDs 1020 and may be coupled to the light guide 1060 with the coupling device 1030. The coupling device 1030 may be, for example, molded, and may be separate from the light guide 1060 and/or the LED array 1010. The coupling device 1030 may be plastic, glass, or another suitable material. In FIG. 10, the coupling device 1030 may be a molded plastic coupler that is positioned so as to align the LEDs 1020 of the LED array 1010 with a portion of the light guide 1060. The coupling device 1030 may have an "I-beam" configuration, as illustrated in FIG. 10. Specifically, the coupling device 1030 may include a first recessed portion 1040 that is dimensioned so as to receive the one or more LEDs 1020, and a second recessed portion 1050 that is dimensioned so as to receive the light guide 1060. In some embodiments, the coupling device 1030 may be reversible and the first recessed portion 1040 may be dimensioned the same as the second recessed portion 1050. The LED array 1010 is shown coupled to the light guide 1060 in the second position. The coupling device 1030 may be formed of a transparent plastic. One or more layers of optically clear adhesive may be applied at interfaces between the coupling device 1030 and the LED array 1010 and/or the light guide 1060.

Figure 11:
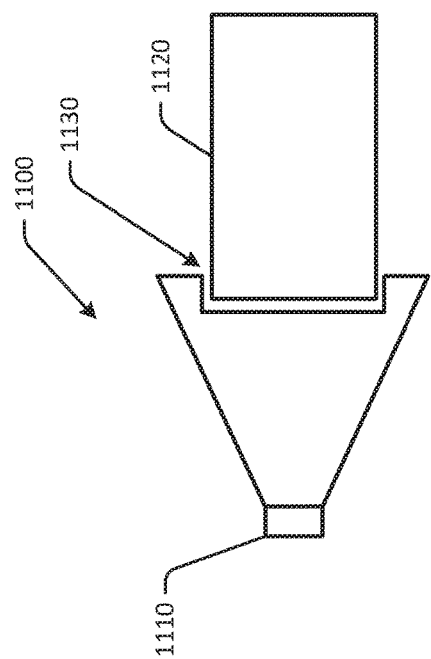
FIG. 11 is a schematic illustration of another embodiment of an LED array coupled to a light guide with a coupling device in accordance with one or more embodiments of the disclosure.

FIG. 11 is a schematic illustration of another embodiment 1100 of an LED 1110 coupled to a light guide 1120 with a coupling device 1130 in accordance with one or more embodiments of the disclosure. FIG. 11 includes another coupling device 1130 that may be a wedged coupling device 1130. The wedged coupling device 1130 may be configured to align the LEDs 1110 of an LED array in a vertical direction for light guides 1120 that are in a relative horizontal direction or orientation. The wedged coupling device 1130 may have certain dimensions, such as a height of 50 microns at one end, a height of 100 microns at an opposite end (height of double the first end), and an appropriate length. The wedged coupling device 1130 may receive a portion of the light guide 1120 at one end.

Figure 12:
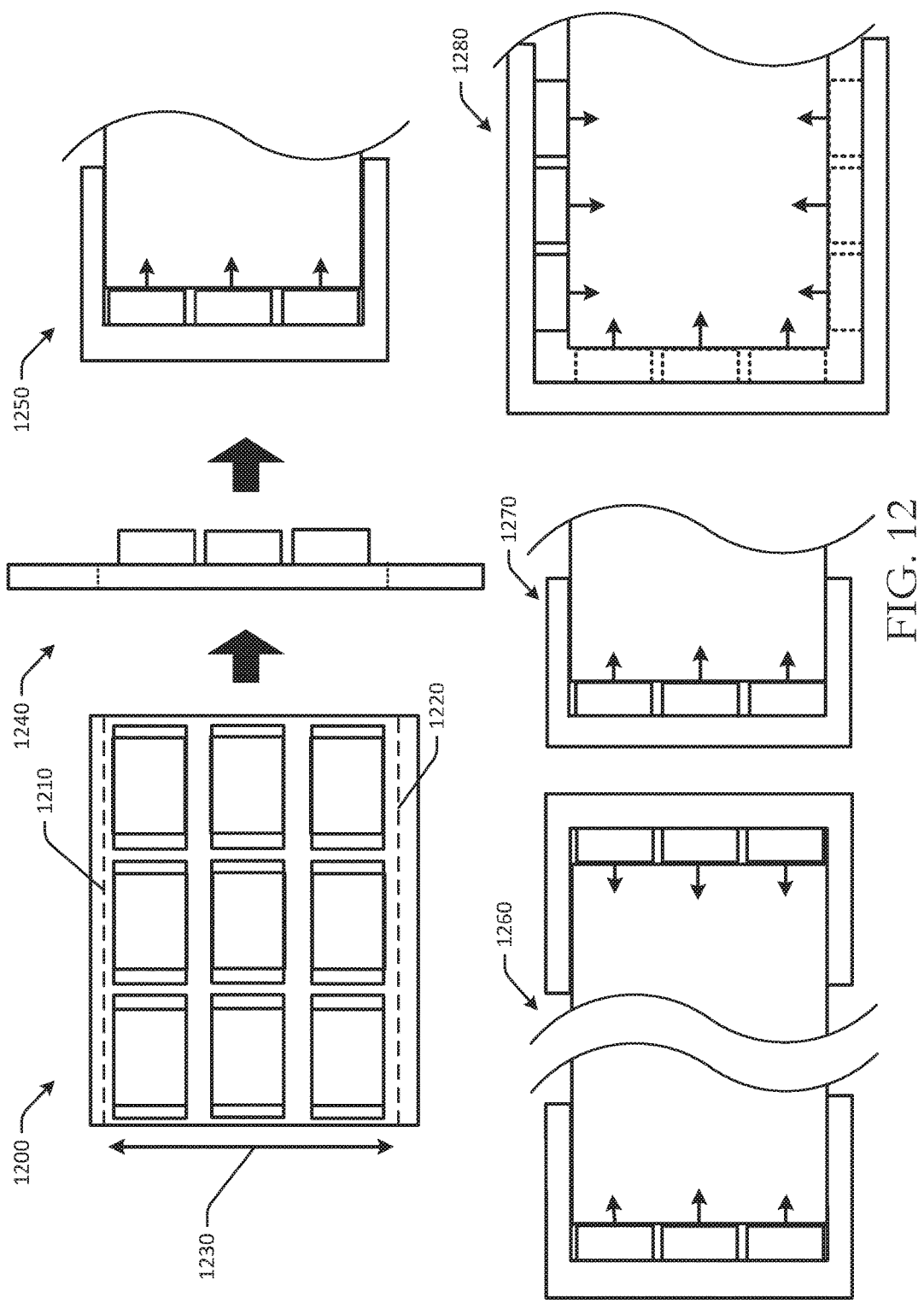
FIG. 12 is a schematic illustration of additional embodiments of multi-row LED arrays coupled to light guides in accordance with one or more embodiments of the disclosure.

FIG. 12 is a schematic illustration of additional embodiments of an LED array 1200 coupled to light guides in accordance with one or more embodiments of the disclosure.

In FIG. 12, the LED array 1200 may include vertically separated red, blue, and green LEDs. The LED array 1200 may include a first score line 1210 and a second score line 1220. The first score line 1210 may be separated from the second score line 1220 by a distance 1230 that may be substantially equal to a thickness or an edge surface length of a corresponding light guide. As shown in cross-sectional view 1240, the rows of LEDs may be positioned between the first score line 1210 and the second score line 1220. In a coupled position 1250, the LEDs may be aligned with an LED edge surface of a light guide. In the coupled position 1250, one LED array may be coupled to one edge of the light guide. In some instances, the LED array 1200 may be coupled to more than one light guide. For example, two or three light guides may be stacked, with one or more LEDs corresponding to one or more light guides.

In another embodiment 1260, two LED arrays may be coupled to two edges of the light guide. In other embodiments, an LED linear light source or LED array may be coupled to four sides of a display or light guide. Any number of LED arrays may be positioned at any number of sides or edge surfaces of a light guide.

In another embodiment 1270, an FPC may be positioned between the LEDs and the substrate in the LED array. The substrate may be white tape. The LED array may be coupled to the LED edge surface of the light guide.

In another embodiment 1280, an LED array may include multiple sets of LEDs in different rows, where multiple rows of LEDs are coupled to one or more surfaces of the light guide. For example, three rows of LEDs may be coupled to a top surface of the light guide, three rows of LEDs may optionally be coupled to a side or end surface of the light guide, and/or three rows of LEDs may optionally be coupled to a bottom surface of the light guide. Some embodiments may include multiple rows of LEDs on two or more surfaces of the light guide. The LEDs on the top of the light guide may have one or more colors, which may be the same or different than LEDs at the bottom of the light guide. For example, both sets of LEDs may include red, green, and blue LEDs, or the top set of LEDs may include yellow LEDs while the bottom set of LEDs includes blue LEDs. In some embodiments, there may be an offset or displacement between the top and bottom sets of LEDs.

Figure 13:
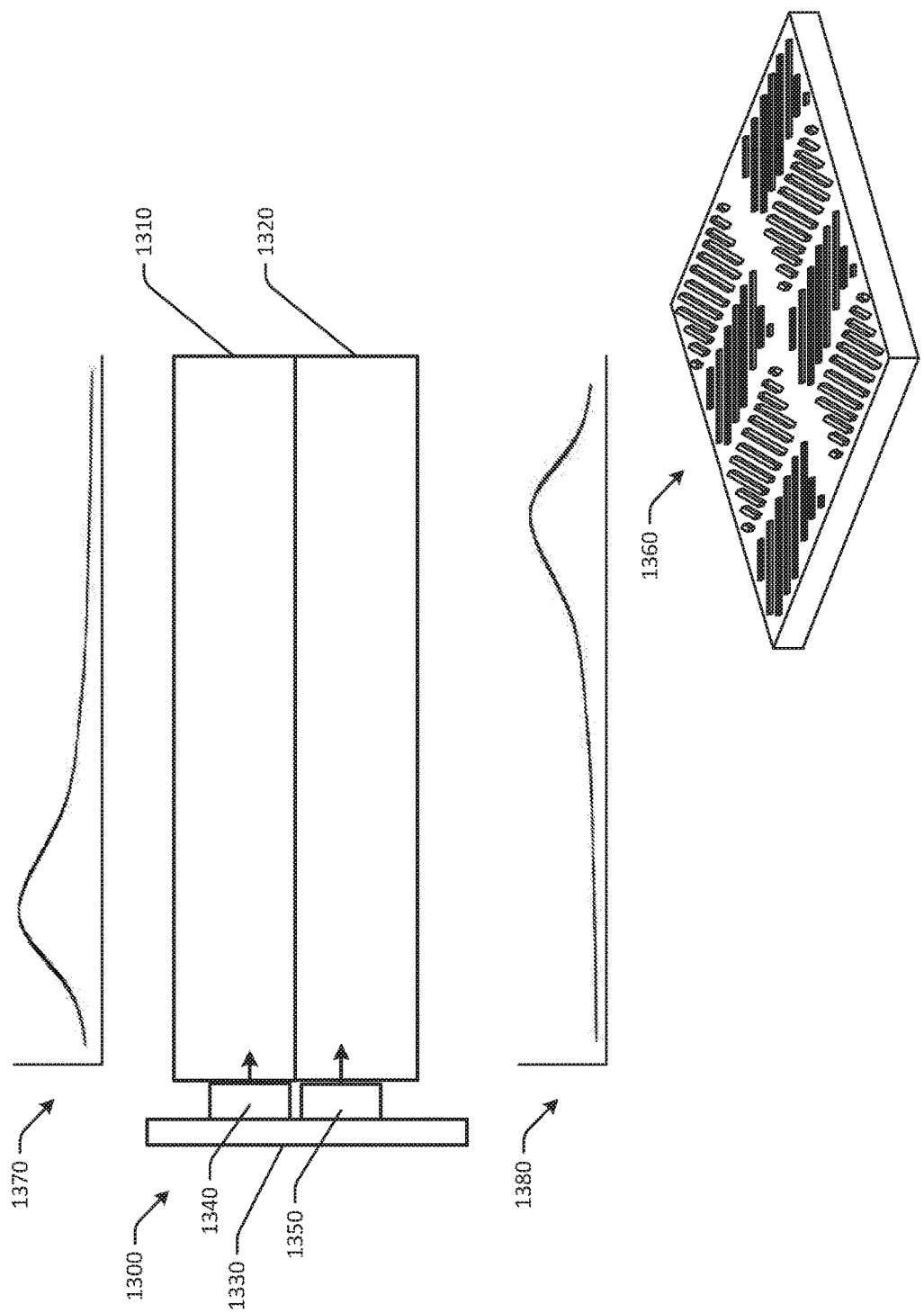
FIG. 13 is a schematic illustration of a multi-row LED array coupled to stacked light guides in accordance with one or more embodiments of the disclosure.

FIG. 13 is a schematic illustration of an LED array 1300 with vertically separated micro-LED components coupled to stacked light guides in accordance with one or more embodiments of the disclosure. In FIG. 13, a first LED 1340, which may be a yellow LED, and a second LED 1350, which may be a blue LED, may be coupled to a substrate 1330. The LED array 1300 may be coupled to a first light guide 1310 that is stacked on a second light guide 1320. A layer of low index optically clear adhesive (e.g., index value less than about 1.6, etc.) may be positioned between the light guides. The first LED 1340 may be aligned with a first LED edge surface of the first light guide 1310, and the second LED may be aligned with a second LED edge surface of the second light guide 1320.

The first and second light guides 1310, 1320 may be stacked or adjacent to each other. The first and second light guides 1310, 1320 may include one or more surface features so as to module light propagating through the respective light guide. Specifically, the first light guide 1310 may include a first set of surface features at an interface between the first LED 1340 and the first light guide 1310, and the second light guide 1320 may include a second set of surface features at an interface between the second LED 1350 and the second light guide 1320. The first set of surface features may cause a first modulation of light from the first LED 1340, while the second set of surface features may cause a second modulation of light from the second LED 1350. A first graph 1370 may illustrate a density of features on the light guide over distance of one of the light guides, and a second graph 1380 may illustrate light intensity over the distance, so as to optimize waveforms for different colors. The modulations may illustrate an amount of light passing through various portions of the respective light guides, and may be modulated so as to avoid excessive overlap. Local brightness of light at the light guide may be dependent on an amount of features, such as extraction features, at that local part of the light guide. For example, the higher the density of extraction features, the more light may illuminate the display. A density of surface features or patterns may correspond to an increase in light, so the first light guide 1310 may have a higher density of surface features or patterns at the front or adjacent to the first LED 1340, while the second light guide 1320 may have a low density of, or no, surface features or patterning at the front or adjacent to the second LED 1350. While light is propagating within the light guides, some light may get absorbed by the light guide material or scatter out before reaching the end of the display. Such losses may result in light coloring, due to attenuation of certain blue wavelengths. The illustrated embodiment may maintain uniform color throughout the display surface since the light guide(s) are designed to extract more blue towards the end of display. The illustrated embodiment may ensure uniform display color, as well as an ability for users to change a tint of the display color. Color components may both be white light, but with different color temperature in one example. For example, one of the components may be bluish, while the other component may be yellowish when compared to each other. In some instances, a white component may be used with a pure yellow component, or a while component may be used with a pure blue component instead of two different kinds or temperatures of white.

The first and/or second light guides 1310, 1320 may include one or more surface features 1360. Surface features 1360 may include patterning, engraving, or other formation of features on a surface of the light guide that affect stray light or light streaking that may be visible to users. The surface features 1360 may include raised portions that extend from a surface of the light guide. Raised portions may be in the form of rectangles, triangles, prisms, or other formations. Other examples of surface features include blazed grating type patterns and standard prismatic type patterns. The surface features 1360 may redirect ambient light so as to turn the ambient light 90 degrees, in some embodiments. The surface features 1360 may provide for light out-coupling points or light in-coupling points. Light in-coupling points are designed to allow light to be passed from LEDs to the light guide. Surface features may include one or more of a diffuser, groove, grating, dimple, lens, planar surface, concave surface, or convex surface. Surface features may be embossed, impressed, etched, and so forth. Surface features may be separate or discrete elements which have been coupled to the light guide. Other embodiments may include different colors and any number of LEDs and/or light guides.

Figure 14:
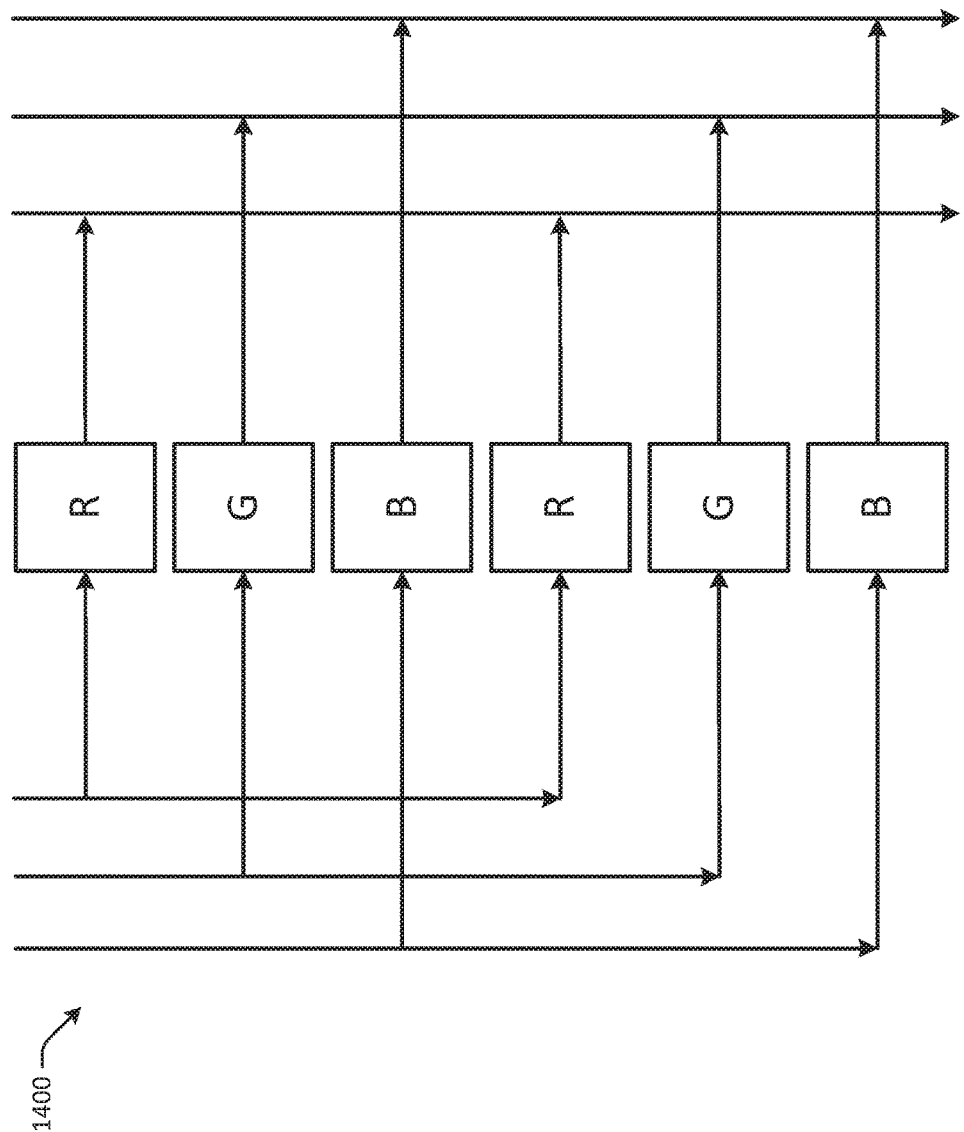
FIG. 14 is a schematic illustration of a parallel driving scheme for an LED array in accordance with one or more embodiments of the disclosure.

FIG. 14 is a schematic illustration of a parallel driving scheme 14000 for an LED array in accordance with one or more embodiments of the disclosure. For example, a first set of red-green-blue LEDs may be positioned adjacent to second set of red-green-blue LEDs. The respective red LEDs may be driven with a first parallel circuit. The respective green LEDs may be driven with a second parallel circuit. The respective blue LEDs may be driven with a third parallel circuit.

Figure 15:
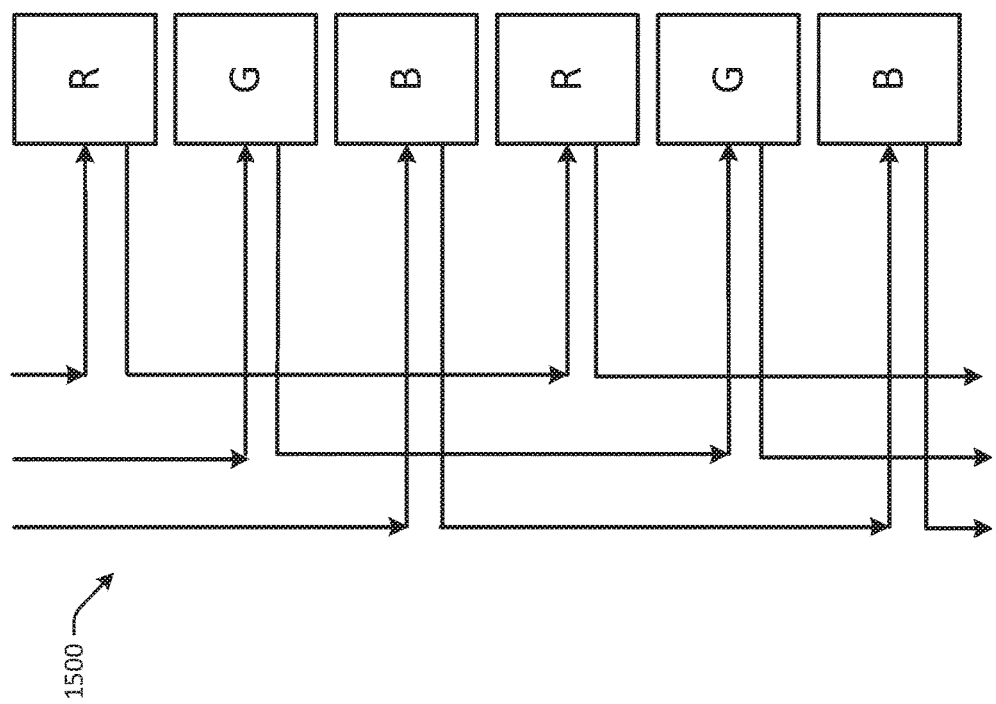
FIG. 15 is a schematic illustration of a serial driving scheme for an LED array in accordance with one or more embodiments of the disclosure.

FIG. 15 is a schematic illustration of a serial driving scheme 1500 for an LED array in accordance with one or more embodiments of the disclosure. For example, a first set of red-green-blue LEDs may be positioned adjacent to second set of red-green-blue LEDs. The respective red LEDs may be driven with a first series circuit. The respective green LEDs may be driven with a second series circuit. The respective blue LEDs may be driven with a third series circuit.

One or more illustrative embodiments of the disclosure have been described above. The above-described embodiments are merely illustrative of the scope of this disclosure and are not intended to be limiting in any way. Accordingly, variations, modifications, and equivalents of embodiments disclosed herein are also within the scope of this disclosure.

Illustrative Device Architecture

Figure 16:
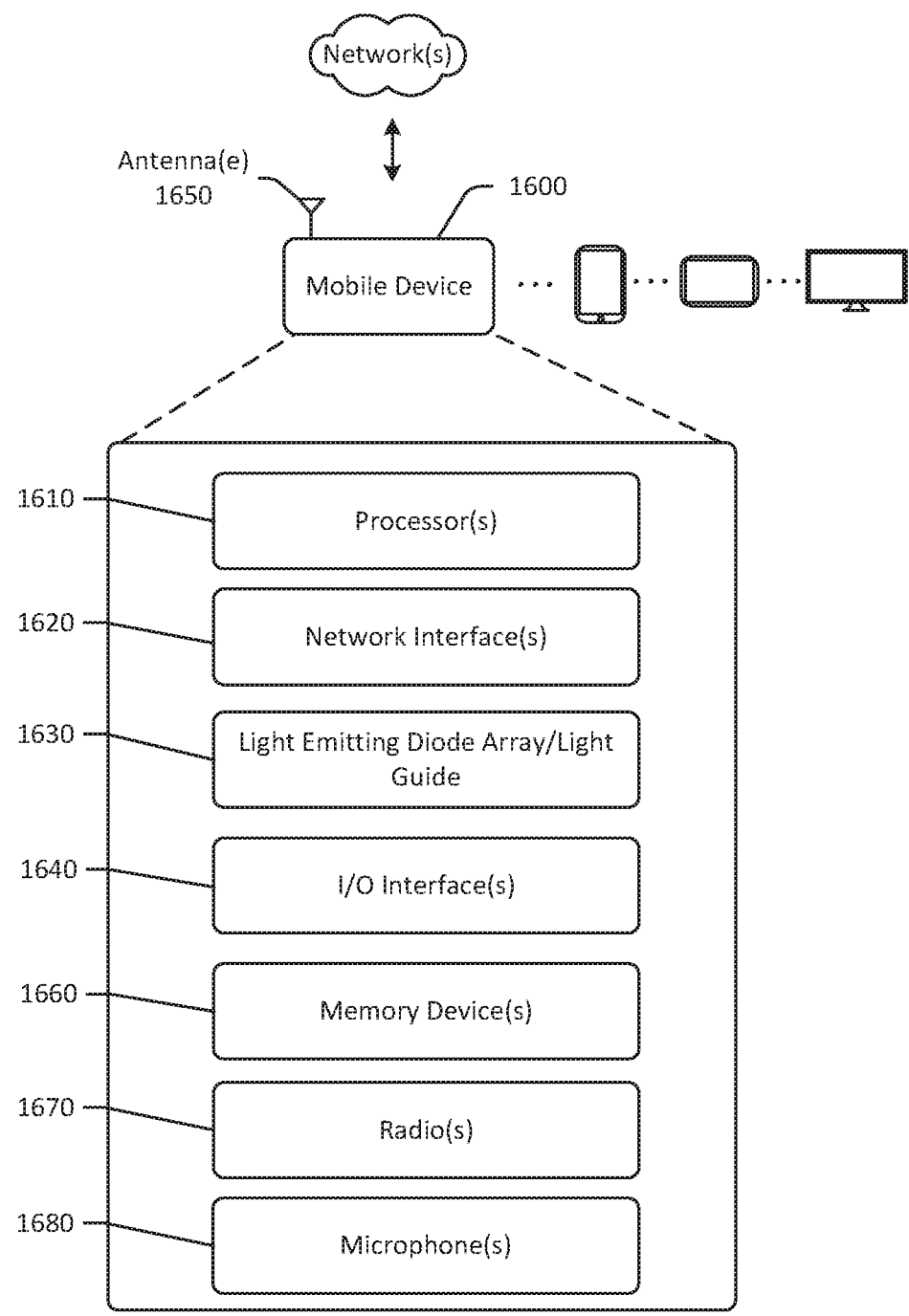
FIG. 16 is a schematic illustration of an example electronic device with an LED illuminator and a light guide in accordance with one or more example embodiments of the disclosure.

FIG. 16 is a schematic illustration of an example electronic device with an LED array and a light guide in accordance with one or more example embodiments of the disclosure. The mobile device 1600 may be any suitable user device including, but not limited to, a mobile device such as a smartphone, a tablet, an e-reader, or the like; a desktop computer; a laptop computer, a game console, a personal media player, and so forth. The mobile device 1600 may present user interfaces and may receive input from users, such as voice commands.

In an illustrative configuration, the mobile device 1600 may include one or more processor(s) 1610, one or more network interface(s) 1620, one or more LED arrays/light guides 1630, one or more input/output ("I/O") interface(s) 1640, one or more antennas 1650, and one or more memory devices 1660 (hereinafter referred to as "memory 1660"). The mobile device 1600 may also include various additional components, such as one or more input/output device(s) configured to interact with the I/O interface 1640 to allow a user to provide input to and/or receive output from the mobile device 1600. The mobile device 1600 may also include an operating system configured to provide an interface between software and hardware resources of the mobile device 1600, and/or database management systems configured to support functionality for storing and retrieving data in one or more datastores (which may include the memory 1660). The mobile device 1600 may further include system buses that functionally couple various components of the mobile device 1600. In other embodiments, the mobile device 1600 may include additional or fewer components.

The processor(s) 1610 may be configured to access the memory 1660 and execute computer-executable instructions loaded therein. For example, the processor(s) 1610 may be configured to execute computer-executable instructions of the various program modules of the mobile device 1600 to cause or facilitate various operations to be performed in accordance with one or more embodiments of the disclosure. The processor(s) 1610 may include any suitable processing unit capable of accepting data as input, processing the input data in accordance with stored computer-executable instructions, and generating output data. The processor(s) 1610 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1610 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1610 may be capable of supporting any of a variety of instruction sets.

The network interface(s) 1620 may be configured to allow the mobile device 1600 to communicate with content providers and other entities over networks, such as local-area networks (LANs), wide-area networks (WANs), the Internet, wireless networks, wireless wide-area networks (WWANs), cable television networks, telephone networks, cellular communications networks, combinations of the foregoing, and/or the like. Further, such networks may have any suitable communication range associated therewith and may include, for example, metropolitan area networks (MANs) or personal area networks (PANs). In addition, such networks may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

The LED array/light guide 1630 may comprise any of the alignment features described herein, and may be configured such that one or more of the LEDs are aligned with one or more of the LED edge surfaces.

One or more input/output (I/O) interfaces 1620 may be provided that may facilitate the receipt of input information by the mobile device 1600 from one or more I/O devices as well as the output of information from the mobile device 1600 to the one or more I/O devices. The I/O devices may include, for example, one or more user interface devices that facilitate interaction between a user and the mobile device 1600 including, but not limited to, a display, a keypad, a pointing device, a control panel, a touch screen display, a remote control device, a microphone, a speaker, and so forth. The I/O devices may further include, for example, any number of peripheral devices such as data storage devices, printing devices, and so forth.

The mobile device 1600 may include one or more antennas 1650 capable of receiving and transmitting signals in accordance with any suitable communications protocol(s). Non-limiting examples of suitable antennas may include directional antennas, non-directional antennas, dipole antennas, folded dipole antennas, patch antennas, multiple-input multiple-output (MIMO) antennas, or the like. The antenna 1650 may be communicatively coupled to one or more transceivers or radio components 1670 to which or from which signals may be transmitted or received. The antenna 1650 of the mobile device 1600 may include, without limitation, a cellular antenna for transmitting or receiving signals to/from a cellular network infrastructure, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), 5G standards, direct satellite communications, or the like. Other example antennas 1650 include a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth.

The antenna 1650 may additionally, or alternatively, include a Wi-Fi antenna configured to transmit or receive signals in accordance with established standards and protocols, such as the IEEE 1602.11 family of standards, including via 2.4 GHz channels (e.g. 802.11b, 802.11g, 802.11n), 5 GHz channels (e.g. 802.11n, 802.11ac), or 60 GHZ channels (e.g. 802.11ad). In alternative example embodiments, the antenna 1650 may be configured to transmit or receive radio frequency signals within any suitable frequency range forming part of the unlicensed portion of the radio spectrum.

The mobile device 1600 may further include a radio 1670 for, in cooperation with the antenna 126, transmitting or receiving radio frequency (RF) signals in the bandwidth and/or channels corresponding to the communications protocols utilized by the mobile device 1600 to communicate with other devices. The radio/transceiver 1670 may include hardware, software, and/or firmware for modulating, transmitting, or receiving, potentially in cooperation with any of antenna(s) 1650, communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The radio 1670 may include any known receiver and baseband suitable for communicating via the communications protocols utilized by the mobile device 1600.

The memory 1660 may include one or more program modules, applications, or the like. Any of the modules may include one or more sub-modules. The memory 1660 of the mobile device 1600 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. In certain example embodiments, volatile memory may enable faster read/write access than non-volatile memory. However, in certain other example embodiments, certain types of non-volatile memory (e.g., FRAM) may enable faster read/write access than certain types of volatile memory. The memory 1660 may include removable and/or non-removable media which may be implemented in any method or technology for storage of information, such as computer-readable instructions, data structures, program modules, or other data.

In various implementations, the memory 1660 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1660 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.). Other examples of memory include EEPROM, flash memory, CD-ROM, digital versatile disks (DVD) or other optical storage, magnetic cassettes, magnetic tape, magnetic disk storage, or other magnetic storage devices, RAID storage systems, or any other medium which can be used to store the desired information and which can be accessed by a computing device.

The mobile device 1600 may optionally include a microphone 1680. The microphone 1680 may be configured to generate signals based at least in part on incident or ambient sounds. The signals generated by the microphone may be analog signals. The microphone 1680 may be configured to receive voice input in the form of analog sound input and may generate electrical signals indicative of the analog sound which may be converted to digital data using an ADC. Although each of these components is shown in the illustrated embodiment, other embodiments may include additional or fewer components.

Although specific embodiments of the disclosure have been described, one of ordinary skill in the art will recognize that numerous other modifications and alternative embodiments are within the scope of the disclosure. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A display stack comprising:
 a display panel;
 a light guide optically coupled to the display panel, the light guide comprising:
  a top surface;
  a bottom surface parallel to the top surface; and
  an end surface perpendicular to the top surface and the bottom surface;
  wherein the light guide comprises a material having a first refractive index value; and
 a light emitting diode array optically coupled to the light guide, the light emitting diode array comprising:
  a flexible printed circuit board;
  a first row of light emitting diodes mounted on the flexible printed circuit board;
  a second row of light emitting diodes mounted on the flexible printed circuit board; and
  a third row of light emitting diodes mounted on the flexible printed circuit board;
 wherein the first row of the light emitting diode array is optically and physically coupled to the top surface, the second row of the light emitting diode array is optically and physically coupled to the end surface, and the third row of the light emitting diode array is optically and physically coupled to the bottom surface.

2. The display stack of claim 1, further comprising:
 a first score line on the flexible printed circuit board between the first row and the second row; and
 a second score line on the flexible printed circuit board between the second row and the third row;
 wherein a distance between the first score line and the second score line is equal to a thickness of the light guide.

3. The display stack of claim 1, further comprising:
 a first layer of an optically clear adhesive disposed between the first row and the top surface;
 a second layer of the optically clear adhesive disposed between the second row and the end surface; and
 a third layer of the optically clear adhesive disposed between the third row and the bottom surface;
 wherein the optically clear adhesive has a second refractive index value equal to the first refractive index value.

4. The display stack of claim 1, wherein the first row of light emitting diodes comprises a first color, the second row of light emitting diodes comprises a second color, and the third row of light emitting diodes comprises a third color; or
 wherein the first row of light emitting diodes comprises a plurality of colors, and wherein the second row of light emitting diodes and the third row of light emitting diodes comprises the plurality of colors.

5. The display slack of claim 2, wherein a first distance between a central axis of the second row and the first score line is equal to a second distance between the central axis and the second score line.

6. A device comprising:
 a light guide with a first surface, a second surface opposite the first surface, and a third surface perpendicular to the first surface and the second surface; and
 a light emitting diode array comprising a first set of light emitting diodes (LEDs) arranged in a first row and a second set of LEDs arranged in a second row on a flexible printed circuit board;
 wherein the first set of LEDs is optically and physically coupled to the first surface and the second set of LEDs is optically and physically coupled to the second surface.

7. The device of claim 6, wherein the light emitting diode array further comprises a third set of LEDs arranged in a third row between the first row and the second row, the third set of LEDs optically and physically coupled to the third surface.

8. The device of claim 6, wherein the light guide comprises a material with a first refractive index value, the device further comprising:
 a first layer of an optically clear adhesive between the first set of LEDs and the first surface;
 a second layer of the optically clear adhesive between the second set of LEDs and the second surface;
 wherein the optically clear adhesive has a second refractive index value substantially equal to the first refractive index value.

9. The device of claim 6, wherein the third surface (i) is a polished surface, or (ii) comprises an evaporated aluminum coating.

10. The device of claim 6, further comprising:
 a first set of surface features formed on the first surface and positioned between the first surface and the first set of LEDs; and
 a second set of surface features formed on the second surface and positioned between the second surface and the second set of LEDs.

11. The device of claim 6, wherein the first set of LEDs comprises LEDs of a plurality of colors; and
 wherein the second set of LEDs comprises LEDs of the plurality of colors.

12. The device of claim 6, wherein the first set of LEDs comprises LEDs of a first color; and
 wherein the second set of LEDs comprises LEDs of a second color.

13. The device of claim 6, wherein the light emitting diode array further comprises:
 a flexible substrate, wherein the first set of LEDs and the second set of LEDs are mounted on the flexible substrate, the flexible substrate comprising:
  a first fold line between the first set of LEDs and the second set of LEDs; and
  a second fold line between the first set of LEDs and the second set of LEDs;
  wherein a distance between the first fold line and the second fold line is equal to a thickness of the light guide.

14. The device of claim 7, wherein the light emitting diode array further comprises:
 a flexible substrate, wherein the first set of LEDs, the second set of LEDs, and the third set of LEDs are mounted on the flexible substrate, the flexible substrate comprising:
  a first fold line between the first set of LEDs and the third set of LEDs; and
  a second fold line between the third set of LEDs and the second set of LEDs.

15. The device of claim 14, wherein a first distance between the first fold line and the first set of LEDs is equal to a second distance between the second fold line and the second set of LEDs.

16. The device of claim 14, wherein a distance between the first fold line and the second fold line is equal to a thickness of the light guide.

17. A device comprising:
 a flexible substrate with at least three sets of light emitting diodes (LEDs) mounted on a surface of the flexible substrate, wherein each of the at least three sets comprises a plurality of LEDs arranged in rows; and a light guide comprising a first surface, a second surface that traverses the first surface, and a third surface that is substantially parallel to the first surface;

wherein a first set of LEDs of the at least three sets of LEDs is optically and physically coupled to the first surface, a second set of LEDs of the at least three sets of LEDs is optically and physically coupled to the second surface, and a third set of LEDs of the at least three sets of LEDs is optically and physically coupled to the third surface.

18. The device of claim 17, further comprising a plurality of fold lines, wherein one fold line of the plurality of fold lines is positioned between a pair of the at least three sets of LEDs.

19. The device of claim 17, further comprising an optically clear adhesive between the at least three sets of LEDs and the light guide, the optically clear adhesive having a first refractive index value that is substantially equal to a second refractive index value of a material forming the light guide.

20. The device of claim 17, further comprising:
a first set of surface features formed on the first surface and positioned between the first surface and the first set of LEDs; and
a second set of surface features formed on the second surface and positioned between the second surface and the second set of LEDs.

* * * * *